United States Patent [19]

Derlich

[11] Patent Number: 4,572,474

[45] Date of Patent: Feb. 25, 1986

[54] MOUNTING ASSEMBLY FOR MACHINES

[75] Inventor: Hans-Joachim Derlich, Hessheim, Fed. Rep. of Germany

[73] Assignee: Klein, Schanzlin & Becker Aktiengesellschaft, Frankenthal(Pfalz), Fed. Rep. of Germany

[21] Appl. No.: 585,973

[22] Filed: Mar. 5, 1984

[30] Foreign Application Priority Data

Mar. 5, 1983 [DE] Fed. Rep. of Germany ....... 3307923

[51] Int. Cl.$^4$ .............................................. F16M 1/00
[52] U.S. Cl. .................................... 248/639; 248/678
[58] Field of Search .............. 248/639, 645, 678, 679, 248/637, 346, 544; 52/292, 294, 696; 417/361

[56] References Cited

U.S. PATENT DOCUMENTS

| | | | |
|---|---|---|---|
| 1,707,203 | 3/1929 | Thornley | 248/639 |
| 1,886,035 | 11/1932 | Mann | 248/639 |
| 1,893,699 | 1/1933 | Dunning | 248/639 |
| 2,032,940 | 3/1936 | Lawrence | 248/669 |
| 2,089,381 | 8/1937 | Kassing | 248/657 |
| 2,538,228 | 1/1951 | Blair | 248/639 |
| 2,966,708 | 1/1961 | Freeman | 52/696 |
| 3,849,857 | 11/1974 | Murray | 248/DIG. 13 |
| 4,117,997 | 10/1978 | Gitzendanner | 248/678 |

FOREIGN PATENT DOCUMENTS 0245775  9/1947  Switzerland ....................... 248/639

Primary Examiner—Ramon S. Britts
Assistant Examiner—Ramon O. Ramirez
Attorney, Agent, or Firm—Peter K. Kontler

[57] ABSTRACT

An assembly for mounting a driven machine and drive includes a support frame on a foundation. The drive is secured to a set of mounting plates which are disposed directly on the support frame. The driven machine is carried by a set of mounting units each of which comprises a pair of spaced carrier elements and a mounting plate arranged between the carrier elements. The carrier elements and the respective mounting plates have cooperating guide means which enable the mounting plates to be adjusted relative to the support frame. In mounting the driven machine and its drive, the two are roughly aligned by shifting the mounting units and/or the mounting plates for the drive on the support frame. Once the driven machine and its drive have been roughly aligned, the mounting units as well as the mounting plates for the drive are anchored in the foundation and welded to the support frame. A fine adjustment of the driven machine relative to the drive is now performed by shifting the mounting plates of the mounting units on the carrier elements. Upon completion of the alignment procedure, the mounting plates of the mounting units are fixed to the carrier elements.

23 Claims, 1 Drawing Figure

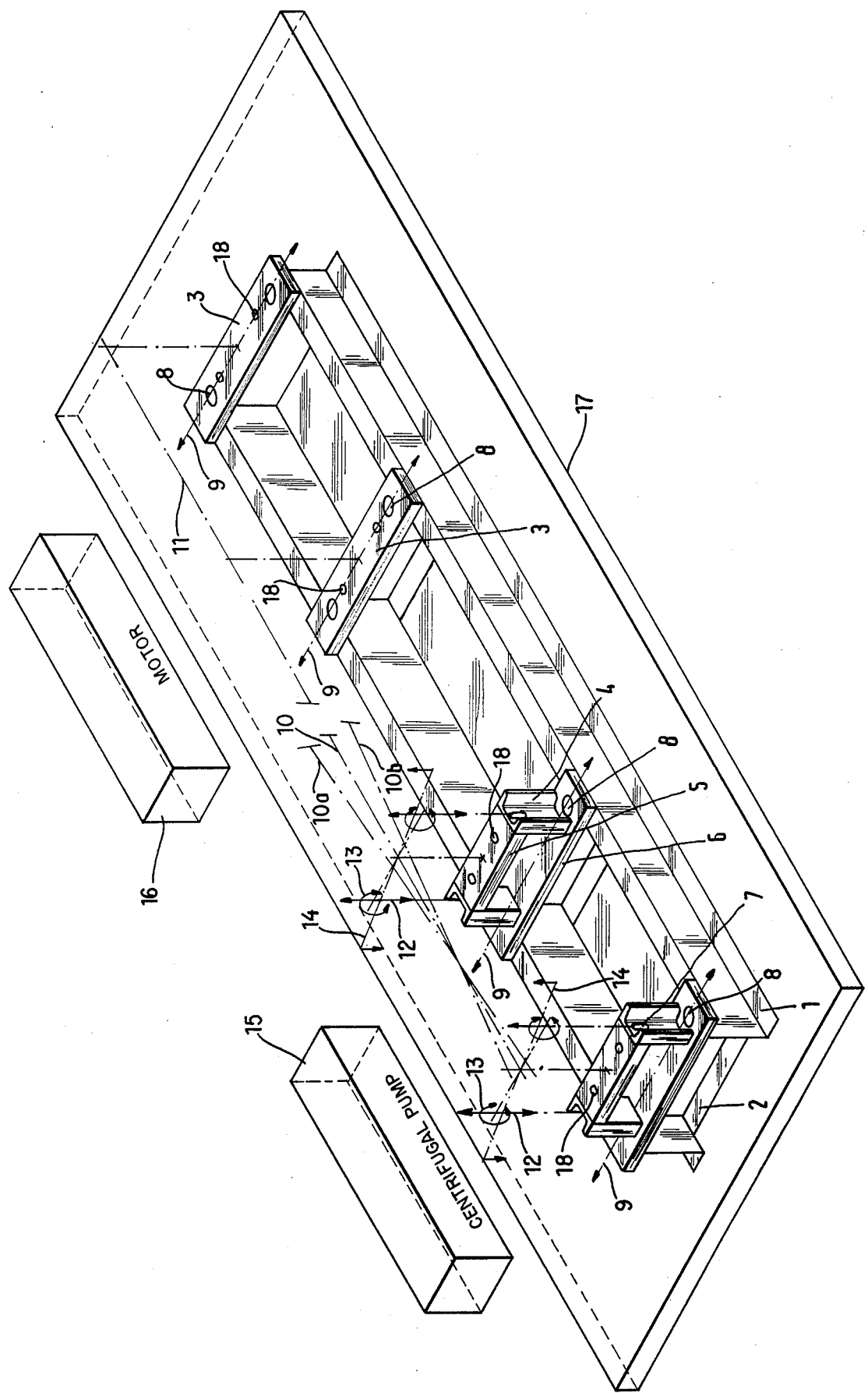

MOUNTING ASSEMBLY FOR MACHINES

BACKGROUND OF THE INVENTION

The invention relates generally to a mounting assembly for machines.

A mounting assembly of the type with which the invention is concerned may be used to mount a driven machine and/or a drive for the same. For example, such a mounting assembly may be used to mount a centrifugal pump and its drive motor.

A known mounting assembly has a pair of spaced, elongated beams which are constituted by steel profiles and extend longitudinally of the mounting assembly. The longitudinal beams are bridged by transverse beams which are likewise constituted by steel profiles. The longitudinal and transverse beams are welded to one another so as to form a support frame. A machine to be mounted rests on the support frame. Adjusting elements are disposed between the machine and the support frame in order to adjust the height and/or angular orientation of the machine.

The mounting assembly is generally constructed in accordance with the special characteristics of the unit, i.e. the machine or machines, to be mounted. In particular, the dimensions and configuration of the mounting assembly are determined by the dimensions and contemplated position of the unit. This makes it virtually impossible to use the mounting assembly for units of different dimensions.

When the unit to be mounted is large, the mounting assembly must also be large. A large mounting assembly of the type outlined above, that is, a large mounting assembly comprising longitudinal and transverse beams which are welded to one another so as to form a frame, has the disadvantage that processing cost are high. Thus, machining of the mounting assembly requires large machines, numerous operations and an expensive transportation system.

A mounting assembly of the type consisting mainly of steel profiles which are welded to one another so as to form a support frame is also used to mount small units such as, for example, a unit composed of a centrifugal pump and its drive motor. The unit to be mounted is connected with the support frame via machined adjusting elements which are screwed to the unit and welded to the support frame. A problem which arises here is that of precisely aligning and adjusting the unit. Any adjustments in height and/or angle must be made either by further processing of the adjusting elements or by the insertion of additional elements.

OBJECTS AND SUMMARY OF THE INVENTION

It is an object of the invention to provide a mounting assembly for machines which may be employed for a wide variety of machines.

Another object of the invention is to provide a mounting assembly for machines which enables adjustments to be made in a relatively simple manner.

An additional object of the invention is to provide a mounting assembly for machines which, although capable of being employed for large machines, may nevertheless be manufactured relatively inexpensively.

The preceding objects, as well as others which will become apparent as the description proceeds, are achieved by the invention.

The invention provides a mounting assembly for machines which comprises support means and mounting means for mounting at least one machine on the support means. The mounting means includes at least one mounting unit having a mounting element which is connectible with the machine. The mounting unit further includes a carrier for the mounting element disposed on the support means. The carrier and the mounting element are provided with cooperating guide means designed to permit adjustment of the mounting element relative to the support means.

The mounting assembly of the invention may be used for mounting a driven machine and/or a drive for the same. For instance, the mounting assembly may be used to mount a centrifugal pump and its drive motor.

The support means may comprise a pair of spaced, elongated structural members or beams which extend longitudinally of the mounting assembly and are preferably constituted by steel profiles. The longitudinal beams are bridged by a plurality of transverse structural members or beams which are preferably also constituted by steel profiles. The longitudinal and transverse beams are connected with one another so as to form a support frame. It is preferred for the longitudinal and transverse beams to be welded to one another.

The mounting element is advantageously in the form of a plate. The carrier may be designed in such a manner that it embraces the mounting element or, in other words, so that the mounting element is located within the carrier. The cooperating guide means on the mounting element and the carrier may be arranged to permit sliding and/or rotational movement of the mounting element. In this manner, the height and/or angular orientation of the machine may be adjusted. Once the machine is properly oriented, the mounting element may be releasably or permanently fixed to the carrier.

The mounting means may comprise an additional mounting unit for mounting an additional machine on the support means. The additional mounting unit need not be designed in the same manner as the first mounting unit and may, for example, be in the form of a mounting element or plate which rests directly on the support means.

The support means may be disposed on a foundation. The mounting means is then advantageously anchored directly in such foundation.

The support means and the mounting means may be composed entirely of standard structural shapes, e.g. steel profiles and flat steel products. Similarly, all connections may be made using standard connectors such as, for example, screws and clamps. These include the connections between the mounting units and the respective machines as well as the connections between the mounting units and the support means. Likewise, standard connectors may be employed to fix the slidable and/or rotatable mounting element to its carrier.

According to one embodiment of the invention, the carrier for the slidable and/or rotatable mounting element is mounted on a base element which rests directly on the support means and is designed to be connected therewith. The base element is preferably constituted by a steel profile or a flat steel product. The carrier comprises a pair of spaced carrier elements which are disposed on the base element and are advantageously in the form of steel profiles. The slidable and/or rotatable mounting element, which is again preferably constituted by a steel profile or a flat steel product, is arranged in the space between the carrier elements.

According to another embodiment of the invention, the base element is omitted and the carrier elements rest directly on the support means.

As mentioned earlier, the carrier and its associated mounting element are provided with cooperating guide means designed to permit adjustment of the mounting element relative to the support means. The cooperating guide means may include slots which are formed in the carrier elements and a pair of locking elements which are provided on the mounting element. Each of the locking elements is received in the slot of a respective carrier element. The locking elements and slots thus cooperate to guide the mounting element on the carrier elements. In addition to their guiding function, the locking elements may be used to fix the mounting element in its desired position on the carrier elements.

The support means and mounting means of the mounting assembly according to the invention may be assembled from simple components which are joined by welding. Relatively small machines suffice even for the production of large mounting assemblies designed in accordance with the invention. The mounting element which is supported by the carrier may be adjusted without further processing and without the use of additional components by simply sliding and/or rotating the same within the guide defined by the cooperating guide means on the carrier and the mounting element. Furthermore, since a machine to be mounted may be connected with the adjustable mounting unit using threaded connectors only, machining of the support surfaces may be eliminated. The substantial simplification which is made possible by the invention stems from the fact that the slidable and/or rotatable mounting element is fixed in position only after having been adjusted.

Moreover, inasmuch as the adjustable mounting unit may be adapted to a wide variety of machines to be mounted, considerable simplification in storage may be achieved. Thus, a large number of different mounting assemblies may be constructed from a stock consisting only of a few support means or support frames of different size and several prefabricated adjustable mounting units. The mounting units may be secured to the support frames with little expense.

In addition to one or more adjustable mounting units for adjustably mounting a machine, the mounting means of the invention may, as mentioned previously, include one or more mounting elements in the form of plates which rest directly on the support means or support frame and carry an additional machine. The design of any mounting elements which are present is such that these may be anchored directly in a foundation serving to carry the support means or support frame. This enables the forces acting on the support frame to be maintained relatively small. The support frame need thus be capable of functioning only as a carrier during transport and as a holder at the erection site, that is, the support frame need not be designed to withstand large forces.

The novel features which are considered as characteristic of the invention are set forth in particular in the appended claims. The improved mounting assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a perspective view of a mounting assembly according to the invention.

DESCRIPTION OF THE PREFERRED EMBODIMENTS

The FIGURE illustrates an assembly in accordance with the invention for mounting a unit made up of a driven machine and a drive for the same. The driven machine is here assumed to be a centrifugal pump 15. A motor 16 serves to drive the centrifugal pump 15.

The mounting assembly for the centrifugal pump-drive motor unit 15,16 comprises a foundation 17 which carries a support frame or support means for the centrifugal pump 15 and the drive motor 16. The support frame includes a pair of generally parallel, spaced, elongated structural members 1 which extend in the longitudinal direction of the mounting assembly. The structural members 1 are in the form of U-shaped steel profiles or beams. The structural members 1 are bridged or connected by four transverse structural members 2 which are likewise in the form of U-shaped profiles or beams. The structural members 1 and 2 are connected to one another so as to form a frame. Preferably, the structural members 1 and 2 are joined to one another by welding.

The motor 16, which may be an electric motor, is mounted on the support frame 1,2 via a pair of mounting units 3. The mounting units 3 are flat and are constituted by steel plates. The mounting plates 3 rest directly on the support frame 1,2 and each of the mounting plates 3 has an anchoring opening 8 in the region of each of its ends. The anchoring openings 8 are designed to receive non-illustrated anchors or bolts which extend into and anchor the mounting plates 3 directly in the foundation 17. Direct anchoring of the mounting plates 3 in the foundation 17 has the advantage that the forces which are generated travel through the legs of the motor 16, the mounting plates 3 and the anchors or bolts directly into the foundation 17 without any further deviations. Accordingly, the anchors or bolts function to hold the mounting plates 3 on the support frame 1,2. As a result, only a few welds need be made between the mounting plates 3 and the support frame 1,2.

Each of the mounting plates 3 also has a pair of mounting openings 18 which are disposed between the respective anchoring openings 8. The mounting openings 18 are designed to receive non-illustrated threaded connectors such as screws or bolts which function to connect the motor 16 with the mounting plates 3. If desired, the motor 16 may be clamped to the mounting plates 3 instead of being connected therewith by means of threaded connectors.

The centrifugal pump 15 is mounted on the support frame 1,2 via a second pair of mounting units. Each of the mounting units for the centrifugal pump 15 comprises a base element 6 which rests directly on the support frames 1,2. In the illustrated embodiment, the base elements 6 are flat and are constituted by steel plates. However, the base elements 6 may also be in the form of steel profiles or beams.

A carrier is mounted on each of the base plates 6. Each carrier includes a pair of carrier elements 4 which are spaced in the longitudinal direction of the respective base plate 6. The carrier elements 4 may be in the form of steel profiles or beams as shown.

A mounting element 5 is disposed between each pair of carrier elements 4. In the illustrated embodiment, the mounting elements 5 are flat and are constituted by steel plates. However, the mounting elements 5 may also be in the form of steel profiles or beams. Each of the mounting plates 5 is provided with a pair of mounting openings 18 which are designed to receive non-illustrated threaded connectors such as screws or bolts for connecting the centrifugal pump 15 to the mounting plates 5. If desired, the centrifugal pump 15 may be secured to the mounting plates 5 by means of clamps rather than threaded connectors.

The carrier elements 4 and mounting plates 5 are provided with cooperating guide means designed to permit adjustment of the mounting plates 5 relative to the support frame 1,2. The guide means include elongated slots 7 which are formed in the carrier elements 4 and extend longitudinally of the latter. The guide means further include threaded locking elements such as screws or bolts which are carried at the ends of the mounting plates 5 and extend through the slots 4. The locking elements have not been illustrated in order to preserve clarity. The locking elements function not only to guide the mounting plates 5 in the slots 7 but also to releasably fix the mounting plates 5 to the carrier elements 4 when the mounting plates 5 are in their desired positions.

Each of the base plates 6 is provided with an anchoring opening 8 in the region of each of its ends. The anchoring openings 8 are designed to receive anchors or bolts which extend into and function to anchor the base plates 6 directly in the foundation 17. Direct anchoring of the base plates 6 in the foundation 17 has the advantage that the forces which are generated travel through the legs of the centrifugal pump, the mounting units 4–6 and the anchors or bolts directly into the foundation 17 without any further deviations. Accordingly, the anchors or bolts function to hold the mounting units 4–7 on the support frame 1,2. As a result, only a few welds need be made between the mounting units 4–6 and the support frame 1,2.

If desired, the base plates 6 may be eliminated and the carrier elements 4 may be mounted directly on the support frame 1,2.

The cooperating guide means on the mounting plates 5 and the carrier elements 4 are designed in such a manner that the mounting plates 5 may be moved towards and away from the support frame 1,2 as indicated by the double-headed arrows 12. The mounting plates 5 may also be tilted about an axis which extends parallel to the longitudinal axis of the support frame 1,2. This is indicated by the double-headed arrows 14. In addition, the mounting plates 5 may be rotated about their longitudinal axes as indicated by the double-headed arrows 13.

The support frame 1,2 as well as the mounting plates 3 and the mounting units 4–6 may be constructed entirely from standard structural shapes such as standard steel profiles or beams and standard flat steel products or plates. Similarly, the centrifugal pump-drive motor unit 15,16 may be secured to the mounting plates 3 and 5 using exclusively standard clamps and/or standard threaded connectors such as standard screws and standard bolts. Likewise, the mounting plates 3 and the mounting units 4–6 may be anchored in the foundation 17 using only standard anchors or bolts. The locking elements which are provided on the mounting plates 5 and are received in the slots 7 of the carrier elements 4 may also all be in the form of standard threaded connectors such as standard screws and standard bolts.

The centrifugal pump-drive motor unit 15,16 is mounted on the support frame 1,2 as follows:

The electric motor 16 is secured to the mounting plates 3. The mounting plates 3 are then placed on the support frame 1,2 together with the motor 16. The mounting plates 3 are positioned so that the shaft of the motor 16, which is indicated by the phantom line 11, extends longitudinally of the support frame 1,2.

The centrifugal pump 15 is now placed on the mounting plates 5 and connected therewith. At this time, the mounting plates 3 and the mounting units 4–6 are not anchored in the foundation 17 or otherwise connected with the support frame 1,2. Thus, if the shaft of the centrifugal pump 15, which is identified by the phantom line 10, is out of alignment with the motor shaft 11 as indicated by the phantom lines 10a and 10b, the mounting units 4–6 and/or the mounting plates 3 may be shifted in order to align the pump shaft 10 with the motor shaft 11. Alignment of the pump shaft 10 and the motor shaft 11 may be achieved by rotating the mounting plates 3 and the mounting units 4–6 about respective vertical axes, by moving the mounting plates 3 and the mounting units 4–6 longitudinally of the support frame 1,2 and/or by displacing the mounting plates 3 and the mounting units 4–6 transverse to the support frame 1,2 as indicated by the double-headed arrows 9.

Once the pump shaft 10 and the motor shaft 11 have been roughly aligned, the mounting plates 3 and the mounting units 4–6 are fixed in position. This is accomplished by anchoring the mounting plates 3 and the mounting units 4–6 to the foundation 17 via anchors or bolts which are inserted into the anchoring openings 8 and by welding the mounting plates 3 and the base plates 6 to the support frame 1,2 as necessary.

Upon rough alignment, the pump shaft 10 and the motor shaft 11 may be connected with one another by means of a suitable coupling. After the mounting plates 3 and the mounting units 4–6 have been fixed in position, fine adjustment of the pump shaft 10 relative to the motor shaft 11 is performed via the coupling. Fine adjustment is carried out by shifting the mounting plates 5 on the carrier elements 4 in the manner indicated by the arrows 12 and/or the arrows 13 and/or the arrows 14. The cooperating guide means on the carrier elements 4 and the mounting plates 5, that is, the slots 7 in the carrier elements 4 and the locking elements carried by the mounting plates 5 and received in the slots 7, permit very precise alignment of the pump shaft 10 and the motor shaft 11 to be achieved.

Once the pump shaft 10 and the motor shaft 11 are properly aligned, the mounting plates 5 are fixed in position on the carrier elements 4 by tightening the locking elements carried by the mounting plates 5. In order to more securely fix the mounting plates 5 against shifting, the mounting plates 5 may be spot welded to the carrier elements 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A mounting assembly for machines, particularly for mounting a centrifugal pump-drive motor unit, said assembly comprising:
   (a) support means; and
   (b) mounting means for mounting at least one machine on said support means, said mounting means including at least one mounting unit having a mounting element which is connectible with the machine, and said mounting unit further having a carrier for said mounting element disposed on said support means, said carrier and said mounting element being provided with cooperating guide means for permitting rotation of said mounting element relative to said support means.

2. The assembly of claim 1, wherein said mounting element comprises a plate.

3. The assembly of claim 1, wherein said mounting element is disposed inside said carrier.

4. The assembly of claim 1, wherein said guide means include means for permitting translation and rotation of said mounting element.

5. The assembly of claim 1, comprising locking means for releasably fixing said mounting element on said carrier in a predetermined position.

6. The assembly of claim 1, comprising locking means for permanently fixing said mounting element on said carrier in a predetermined position.

7. The assembly of claim 1, wherein said mounting means comprises an additional mounting unit for mounting an additional machine on said support means.

8. The assembly of claim 7, wherein said additional mounting unit comprises an additional mounting element which is connectible with the additional machine and rests directly on said support means.

9. The assembly of claim 1, wherein said support means comprises a pair of spaced, elongated structural members, and a plurality of transverse structural members bridging said elongated members so as to form a frame.

10. The assembly of claim 9, wherein said structural members comprise steel profiles.

11. The assembly of claim 9, wherein said elongated members and said transverse members are welded to one another.

12. The assembly of claim 1, comprising a foundation which carries said support means, and wherein said mounting means is anchored directly in said foundation.

13. The assembly of claim 1, wherein said support means and said mounting means consist essentially of structural shapes.

14. The assembly of claim 13, wherein said support means and said mounting means consist essentially of steel profiles and flat steel products.

15. The assembly of claim 13, comprising locking means for fixing said mounting element on said carrier in a predetermined position, first connecting means for connecting the machine with said mounting element, and second conecting means for connecting said mounting unit with said support means.

16. The assembly of claim 15, wherein said locking means and said connecting means consist essentially of screws, bolts and clamps.

17. The assembly of claim 1, said mounting unit further comprising a base element which rests on said support means and is connectible therewith; and wherein said carrier includes a pair of spaced carrier elements which are disposed on said base element and together define a space, said mounting element being arranged in said space.

18. The assembly of claim 17, wherein said base element and said mounting element each comprise a steel profile or a flat steel product and said carrier elements each comprise a steel profile.

19. The assembly of claim 1, wherein said carrier includes a pair of spaced carrier elements which rest directly on said support means and together define a space, said mounting element being arranged in said space.

20. The assembly of claim 19, wherein said mounting element comprises a steel profile or a flat steel product and said carrier elements each comprise a steel profile.

21. A mounting assembly for machines, particularly for mounting a centrifugal pump-drive motor unit, said assembly comprising:
   (a) support means; and
   (b) mounting means for mounting at least one machine on said support means, said mounting means including at least one mounting unit having a mounting element which is connectible with the machine, and said mounting unit further having a carrier for said mounting element disposed on said support means, said carrier and said mounting element being provided with cooperating guide means for permitting adjustment of said mounting element relative to said support means, and said guide means comprising at least one slot in said carrier and at least one locking element on said mounting element, said locking element being received in said slot and being designed to fix said mounting element in a predetermined position on said carrier.

22. The assembly of claim 21, said carrier including a pair of spaced carrier elements which together define a space, and said mounting element being arranged in said space; and wherein said guide means comprise a slot in each of said carrier elements and a pair of locking elements on said mounting element, each of said locking elements being received in one of said slots, and said locking elements being designed to fix said mounting element in a predetermined position on said carrier.

23. The assembly of claim 21, wherein said locking element comprises a screw or a bolt.

* * * * *